United States Patent
Subrahmaniam et al.

(10) Patent No.: US 9,729,948 B1
(45) Date of Patent: Aug. 8, 2017

(54) SYSTEMS AND METHODS FOR DISCOVERY OF A CONTROLLER IN OPENFLOW NETWORKS

(71) Applicant: Infinera Corporation, Annapolis Junction, MD (US)

(72) Inventors: Ramesh Subrahmaniam, Fremont, CA (US); Madhukar Anand, Fremont, CA (US); Balaji Balasubramanian, Sunnyvale, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 15/093,423

(22) Filed: Apr. 7, 2016

(51) Int. Cl.
| H04B 10/00 | (2013.01) |
| H04Q 11/00 | (2006.01) |
| H04L 29/12 | (2006.01) |
| H04L 12/741 | (2013.01) |
| H04L 5/00 | (2006.01) |
| H04L 12/733 | (2013.01) |
| G06F 17/30 | (2006.01) |

(52) U.S. Cl.
CPC ... *H04Q 11/0005* (2013.01); *G06F 17/30365* (2013.01); *H04L 5/0048* (2013.01); *H04L 45/20* (2013.01); *H04L 45/745* (2013.01); *H04L 61/2007* (2013.01); *H04Q 2011/0035* (2013.01)

(58) Field of Classification Search
CPC .................................................. H04L 45/02
USPC ..................................................... 398/45–57
See application file for complete search history.

(56) References Cited

U.S. PATENT DOCUMENTS

| 9,094,285 B2 * | 7/2015 | Gorkemli ............... H04L 41/12 |
| 9,104,643 B2 * | 8/2015 | DeCusatis ........... G06F 11/2005 |
| 9,110,866 B2 * | 8/2015 | DeCusatis ........... G06F 11/2005 |
| 2013/0071116 A1 * | 3/2013 | Ong ...................... H04L 45/586 |
| | | 398/45 |
| 2014/0211661 A1 * | 7/2014 | Gorkemli ............... H04L 41/12 |
| | | 370/255 |
| 2015/0019902 A1 * | 1/2015 | DeCusatis ........... G06F 11/2005 |
| | | 714/4.11 |
| 2015/0312132 A1 * | 10/2015 | Gorkemli ............... H04L 41/12 |
| | | 370/244 |
| 2015/0381428 A1 * | 12/2015 | Ong ...................... H04L 41/12 |
| | | 709/223 |

(Continued)

OTHER PUBLICATIONS

"EtherProxy: Scaling Ethernet by Suppressing Broadcast Traffic," Khaled Elmeleegy and Alan L. Cox, IEEE INFOCOM 2009, pp. 1584-1592, Apr. 19-25, 2009.

(Continued)

*Primary Examiner* — Agustin Bello
(74) *Attorney, Agent, or Firm* — David L. Soltz (57) ABSTRACT

Systems and methods for discovery of a controller in an OpenFlow network may include using an OpenFlow capable switch to discover the controller without the help of other components, such as DHCP. The link discovery protocol may be configured on the switch and the discovery process may use an out-of-band or an in-band communication. In one example, a link discovery protocol packet is sent out of all ports of a switch that meet the eligibility criteria. The response is guaranteed because of a TTL like mechanism in the packet. Each port on a switch that receives this link discovery protocol packet takes an action depending on its current state.

20 Claims, 7 Drawing Sheets

(56) References Cited

U.S. PATENT DOCUMENTS

| | | | | |
|---|---|---|---|---|
| 2016/0087873 A1* | 3/2016 | Wang | ............... | H04L 45/02 |
| | | | | 370/254 |
| 2016/0112306 A1* | 4/2016 | Song | ............... | H04L 12/6418 |
| | | | | 398/45 |
| 2016/0112327 A1* | 4/2016 | Morris | ............... | H04L 47/127 |
| | | | | 398/45 |
| 2016/0277279 A1* | 9/2016 | Lin | ............... | H04L 45/02 |
| 2016/0315964 A1* | 10/2016 | Shetty | ............... | H04L 63/168 |
| 2017/0026244 A1* | 1/2017 | Kamath | ............... | H04L 45/38 |
| 2017/0026263 A1* | 1/2017 | Gell | ............... | H04L 43/0882 |
| 2017/0048113 A1* | 2/2017 | Wang | ............... | H04L 12/4641 |
| 2017/0063637 A1* | 3/2017 | Kashyap | ............... | H04L 41/12 |

OTHER PUBLICATIONS

"Revisiting Ethernet: Plug-and-play made scalable and efficient," Changhoon Kim and Jennifer Rexford, Local & Metropolitan Area Networks, 2007, LANMAN 2007, 15th IEEE Workshop, pp. 163-169, Jun. 10-13, 2007.

* cited by examiner

SYSTEMS AND METHODS FOR DISCOVERY OF A CONTROLLER IN OPENFLOW NETWORKS

FIELD OF DISCLOSURE

This disclosure relates generally to optical communication networks and more specifically, but not exclusively, to discovering a controller in OpenFlow configured optical communication networks.

BACKGROUND

Software defined networking (SDN) is an approach to using open protocols, such as OpenFlow, to apply globally aware software control at the edges of the network to access network switches and routers that typically would use closed and proprietary firmware. OpenFlow is a programmable network protocol designed to manage and direct traffic among routers and switches from various vendors. It separates the programming of routers and switches from underlying hardware. The technology consists of three parts: flow tables installed on switches, a controller and a proprietary OpenFlow protocol for the controller to talk securely with switches. Flow tables are set up on switches. Controllers talk to the switches via the OpenFlow protocol and impose policies on flows. The controller could set up paths through the network optimized for specific characteristics, such as speed, fewest number of hops or reduced latency. So, for example, a simple flow might be defined as any traffic from a given Internet Protocol (IP) address. The rule governing it might be to route the flow through a given switch port. With its knowledge of the network, the controller could set up paths through the network optimized for speed, fewest number of hops or reduced latency, among other characteristics.

OpenFlow provides an open way to establish connectivity between a controller and a node in an SDN environment. IP connectivity is assumed before the controller can configure and set up the node. Before this configuration can happen a node and controller need to discover each other. Without the controller discovering the OpenFlow node, the controller cannot configure the node and without the node discovering a controller in the OpenFlow Network, the node cannot start to establish a connection with the controller.

Most of the present state of the art centers on topology discovery by the controller and also by using standard mechanisms such as Dynamic Host Configuration Protocol (DHCP) for example. For this to work the switches should support DHCP and if the DHCP servers are beyond a routed subnet DHCP relays need to be present. Further, DHCP is a broadcast based service discovery protocol, which limits its scalability in large networks due to the increase in required overhead. Moreover, current mechanisms address Controller discovery only when the IP connectivity has been established between the switch and the controller(s).

Accordingly, there is a need for systems, apparatus, and methods that improve upon conventional approaches including the improved methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, a method includes: setting a current state of a first port of a first device to a second state that indicates the first port of the first device has not sent or received one of a first discovery message or a second discovery message; transmitting the first discovery message to a first port of a second device connected to the first port of the first device, the first discovery message having a first message type; upon transmitting the first discovery message, setting the current state of the first port of the first device to a fourth state that indicates the first port of the first device has sent the first discovery message; receiving a first response message at the first port of the first device; if the first response message has a second message type, updating a database of the first device with an IP address of the second device and setting the current state of the first port of the first device to a first state that indicates a controller has been discovered; and if the first response message has a third message type, updating the database of the first device with an IP address in the first response message and setting the current state of the first port of the first device to the first state that indicates the controller has been discovered.

In another aspect, an apparatus includes: a first controller configured to set a current state of a first port of a first device to a second state that indicates the first port of the first device has not sent or received one of a first discovery message or a second discovery message; transmit a first discovery message to a first port of a second device connected to the first port of the first device, the first discovery message having a first message type; upon transmitting the first discovery message, set the current state of the first port of the first device to a fourth state that indicates the first port of the first device has sent the first discovery message; receive a first response message at the first port of the first device; if the first response message has a second message type, update a database of the first device with an IP address of the second device and setting the current state of the first port of the first device to a first state that indicates a controller has been discovered; and if the first response message has a third message type, update the database of the first device with an IP address in the first response message and setting the current state of the first port of the first device to the first state that indicates the controller has been discovered.

In still another aspect, a non-transient computer readable medium containing program instructions for causing a processor to perform a process includes: setting a current state of a first port of a first device to a second state that indicates the first port of the first device has not sent or received one of a first discovery message or the second discovery message; transmitting a first discovery message to a first port of a second device connected to the first port of the first device, the first discovery message having a first message type; upon transmitting the first discovery message, setting the current state of the first port of the first device to a fourth state that indicates the first port of the first device has sent the first discovery message; receiving a first response message at the first port of the first device; if the first response message has a second message type, updating a database of the first device with an IP address of the second device and setting the current state of the first port of the first device to a first state that indicates a controller has been discovered; and if the first response message has a third message type, updating the database of the first device with an IP address in the first response message and setting the current state of the first port of the first device to the first state that indicates the controller has been discovered.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein advantageously address the industry needs, as well as other previously unidentified needs, and mitigate shortcomings of the conventional methods, apparatus, and systems. For example, systems and methods for discovery of a controller in an OpenFlow network may include using an OpenFlow capable switch to discover the controller without the help of other components, such as DHCP. The link discovery protocol may be configured on the switch and the discovery process may use an out-of-band or an in-band communication. In one example, a link discovery protocol packet is sent out of all ports of a switch that meet the eligibility criteria. The response is guaranteed because of a Time To Live (TTL, is a value in an IP packet that limits the lifespan of a packet of data in a network) like mechanism in the packet. Each port on a switch that receives this link discovery protocol packet takes an action depending on its current state.

Figure 1A:
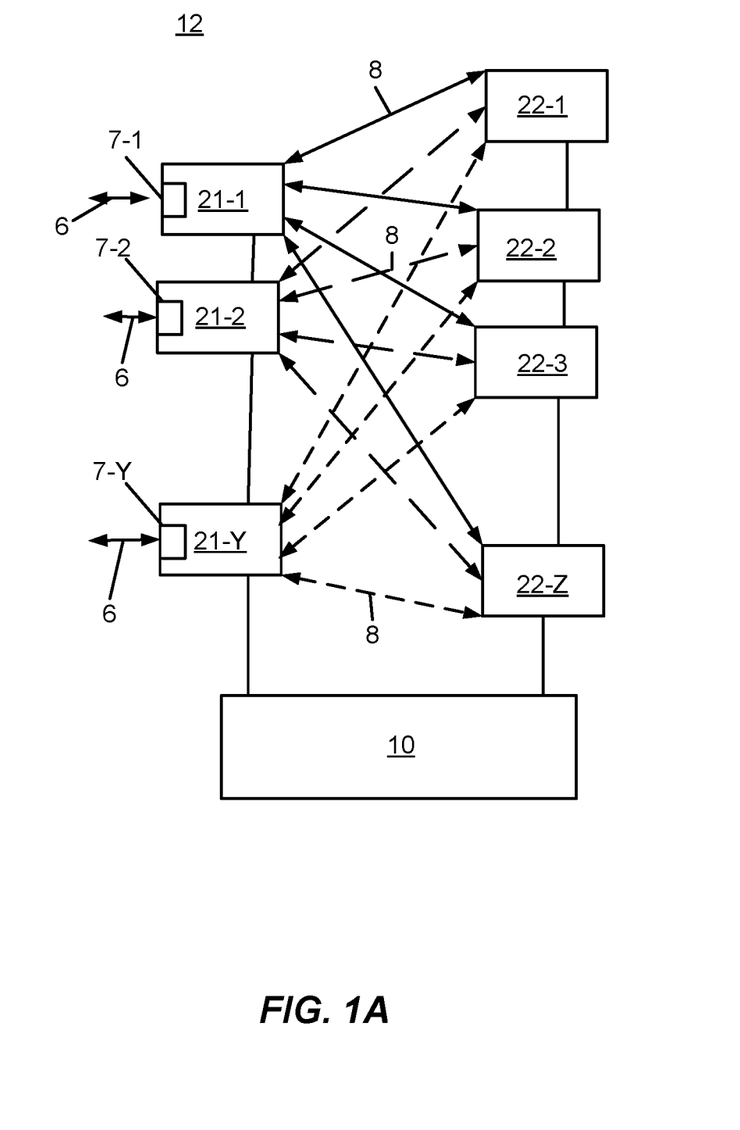
FIG. 1A illustrates an exemplary node of a network in accordance with some examples of the disclosure. in accordance with some examples of the disclosure.

FIG. 1A is a diagram of exemplary components of node 12. As shown in FIG. 1A, node 12 may include a controller 10 configurable to control the operation of the node 12 including connection admission (e.g. a software defined networking controller capable of connection admission control), line cards or modules 21-1, 21-2, . . . , 21-Y (referred to collectively as "line modules 21," and individually as "line module 21") (where Y≥1) connected to switching planes 22-1, 22-2, . . . 22-Z (referred to collectively as "switching planes 22," and individually as "switching plane 22") (where Z≥1). While FIG. 1A shows a particular number and arrangement of components, node 12 may include additional, fewer, different, or differently arranged components than those illustrated in FIG. 1A. Also, it may be possible for one of the components of node 12 to perform a function that is described as being performed by another one of the components. Node 12 may configured as a TDM capable optical switch, a router, a reconfigurable optical add/drop multiplexer (ROADM) such as Infinera's DTN-X packet optical transport capable switch, Infinera's EMXP packet-optical transport switch, or similar device configurable to provide Carrier Ethernet services. Node 12 may also be referred to as a device, such as a first device, a second device etc.

Line module 21 may include hardware components such as one or more ports 7-1, 7-2, . . . , 7-Y, or a combination of hardware and software components, that may provide network interface operations. Line module 21 may receive a multi-wavelength optical signal 6 and/or transmit a multi-wavelength optical signal 6 at the ports 7. A multi-wavelength optical signal 6 may include a number of optical signals of different optical wavelengths. In one implementation, line module 21 may perform retiming, reshaping, regeneration, time division multiplexing, and/or recoding services for each optical wavelength signal 6.

Switching plane 22 may include hardware components, or a combination of hardware and software components, that may provide switching functions to transfer data between line modules 21. In one implementation, switching plane 22 may provide fully non-blocking transfer of data. As to be explained below, switching plane 22 may be programmed to transfer data from a particular input port 6 to a particular output port 6.

As shown in FIG. 1A, each of line modules 21 may connect to each of switching planes 22 with a plurality of connections 8. The connections 8 between line modules 21 and switching planes 22 may be bidirectional. While a single connection 8 is shown between a particular line module 21 and a particular switching plane 22, the connection 8 may include a pair of unidirectional connections (i.e., one in each direction). A connection 8 from a line module 21 to a switching plane 22 will be referred to herein as an "ingress switch link," and a connection 8 from a switching plane 22 to a line module 21 will be referred to as an "egress switch link."

Figure 1B:
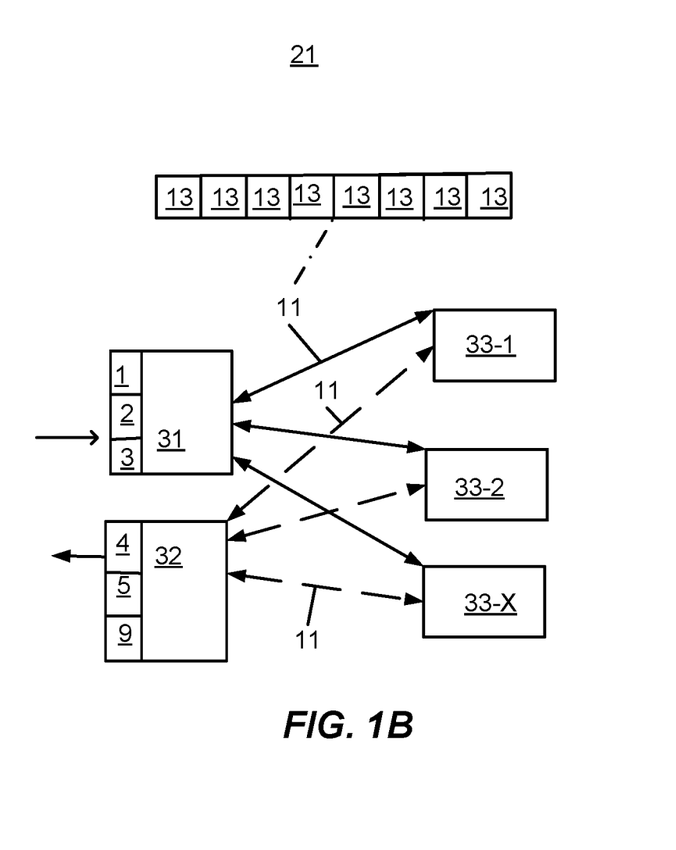
FIG. 1B illustrates an exemplary line module of the node in FIG. 1A in accordance with some examples of the disclosure.

FIG. 1B is a diagram of exemplary components of a line module 21. As shown in FIG. 1B, line module 21 may include a receiver (RX) photonic integrated circuit (PIC) 31 (e.g. a port 7-1), a transmitter (TX) PIC 32 (e.g. a port 7-2), and fabric managers (FMs) 33-1, 33-2, . . . , 33-X (referred to collectively as "FMs 33," and individually as "FM 33") (where X≥1). While FIG. 1B shows a particular number and arrangement of components, line module 21 may include additional, fewer, different, or differently arranged components than those illustrated in FIG. 1B. Also, it may be possible for one of the components of line module 21 to perform a function that is described as being performed by another one of the components.

Receiver PIC 31 may include hardware, or a combination of hardware and software, that may receive a multi-wavelength optical signal 6, separate the multi-wavelength signal 6 into signals of individual wavelengths, and convert the signals 6 to electrical (i.e. digital or analog) signals 11. In one implementation, receiver PIC 31 may include components, such as a photodetector 1, a demultiplexer 2, and/or an optical-to-electrical converter 3. Transmitter PIC 32 may include hardware, or a combination of hardware and software, that may convert signals 11 from digital form into a multi-wavelength optical signal 6, and transmit the multi-wavelength signal 6. In one implementation, transmitter PIC 32 may include components, such as an electrical-to-optical converter 4, a multiplexer 5, and/or a laser 9. As shown in FIG. 1B, receiver PIC 31 and transmitter PIC 32 may connect to each of FMs 33. Receiver PIC 31 may transfer signals 11 to FMs 33. Transmitter PIC 32 may receive signals 11 from FMs 33.

FM 33 may include hardware, or a combination of hardware and software, that may process digital signals 11 for transmission to switching plane 22 or transmitter PIC 32. In one implementation, FM 33 may receive a stream of signals 11 from receiver PIC 31 and divide the stream into time slots 13. In one implementation, each time slot 13 may include the same quantity of bytes (e.g., each time slot 13 may contain an equal amount of bandwidth). In another implementation, each time slot 13 may not include the same quantity of bytes (e.g., at least one time slot may contain a different amount of bandwidth). The stream of signals 11 received by FM 33 may, in one implementation, already be segmented into time slots 13, for example when the multi-wavelength optical signal 6 is received already divided into time slots 13. In this situation, when dividing the signals 11 into time slots 13, FM 33 may identify the time slots 13 based on, for examples, identifiers in the signals 11.

In one implementation, the quantity of time slots 13 may equal the quantity of switches available in switching planes 22. Assume, for example, that there are sixteen switches available in switching planes 22. In this case, FM 33 may divide the signals 11 into sixteen equal time slots 13. FM 33 may send each of the time slots 13 to a different one of the switches. In one implementation, FM 33 may sequentially send each of the time slots 13 in a round robin fashion. In another implementation, FM 33 may send out each of the time slots 13 in another systematic fashion.

Figure 1C:
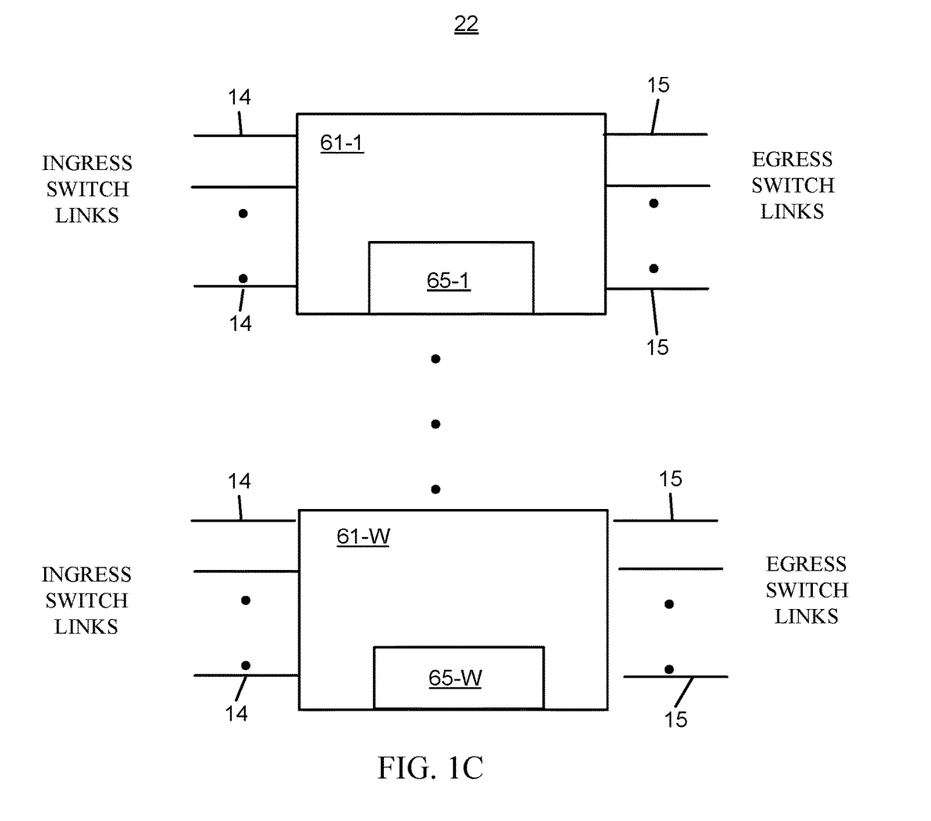
FIG. 1C illustrates an exemplary switch of the node in FIG. 1A in accordance with some examples of the disclosure.

FIG. 1C is a diagram of exemplary components of a switching plane 22. As shown in FIG. 1C, switching plane 22 may include switches 61-1, . . . , 61-W (referred to collectively as "switches 61," and individually as "switch 61") (where W≥1). While FIG. 1C shows a particular number and arrangement of components, switching plane 22 may include additional, fewer, different, or differently arranged components than those illustrated in FIG. 1C. Also, it may be possible for one of the components of switching plane 22 to perform a function that is described as being performed by another one of the components.

Switch 61 may include hardware, or a combination of hardware and software, that may transfer a received time slot 13 on an ingress switch link 14 to a time slot 13 on an egress switch link 15, where the time slot 13 on the ingress switch link 14 may differ from the time slot 13 on the egress switch link 15. Switch 61 may include a set of ingress switch links 14 via which time slots 13 are received, and a set of egress switch links 15 via which time slots 13 are transmitted. Each ingress switch link 14 and egress switch link 15 may connect to a particular FM 33.

Switch 61 may include a configuration database 65. Configuration database 65 may store mapping information that instructs switch 61 on which egress switch link 15 and in what time slot 13 to send a block of data received within a particular time slot 13 on a particular ingress switch link 14 along with information on what port 7 to use. The mapping information may be programmed by an operator of node 12 on a per node 12 basis, and may remain fixed until changed by the operator. Alternatively, the mapping information may be programmed under the control of a network-level routing and signaling algorithm, and may remain fixed until changed by the algorithm. In one implementation, each of switches 61 may store identical mapping information. In other words, each of switches 61 may be programmed to map time slot A on its ingress switch link B to time slot C on its egress switch link D.

In one implementation, configuration database 65 may store the mapping information in the form of a table, such as provided below.

| Egress Switch Link 15 | Egress Time slot 13 | Ingress Switch Link 14 | Ingress Time slot 13 |
|---|---|---|---|
| #8 | #14 | #1 | #10 |

This information may identify an ingress switch link 14 and ingress time slot 13 (e.g., a time slot 13 on the ingress switch link 14) for each egress switch link 15 and egress time slot 13 (e.g., a time slot 13 on the egress switch link 15). As shown, for example, the mapping information may map time slot #10 on ingress switch link #1 to time slot #14 on egress switch link #8.

The exemplary TDM capable node 12 described above may be used in conjunction with any of the following resource allocation methods or systems described below wherein the resource on the link is a time slot 13 (TS). Thus, resource and time slot 13 is used interchangeably in the following description.

Figure 1D:
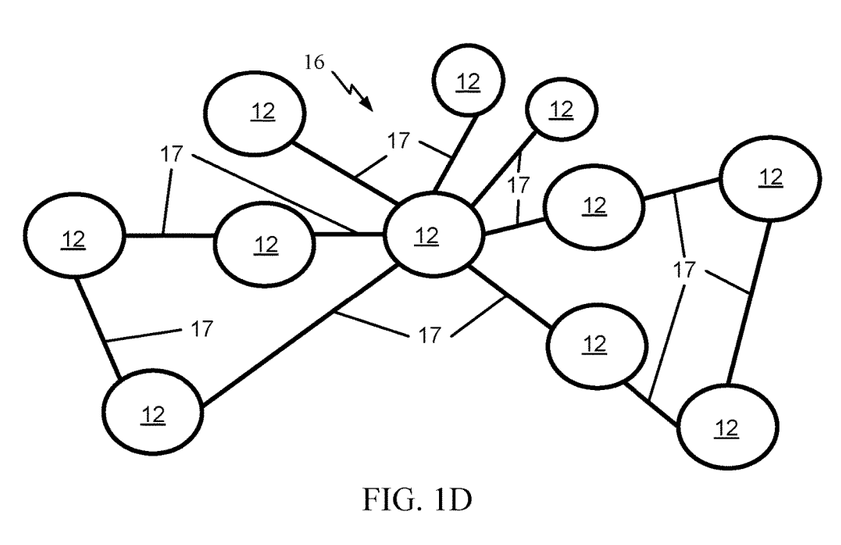
FIG. 1D illustrates an exemplary network configuration of the nodes in FIG. 1A in accordance with some examples of the disclosure.

FIG. 1D illustrates an exemplary network configuration of the nodes in FIG. 1A in accordance with some examples of the disclosure. As shown in FIG. 1D, an optical network 16 may include a plurality of nodes 12 interconnected by a plurality of connections 17. Each of the plurality of connections 17 may be configured to transport a plurality of multi-wavelength optical signals 6 having a plurality of time slots 13 or in another format. Each of the plurality of connections 17 may be, for example, a uni-directional or bi-direction medium such as an optical fiber capable of transporting an optical signal 6 or an electrical signal 11. The following examples describe apparatus and methods for use in conjunction with node 12.

Systems and methods for discovery of a controller (e.g. controller 10) in an OpenFlow configured network, for example, may be used in conjunction with node 12 described in FIGS. 1A-1D. While the systems and methods described herein may be used in various types of networks that used different transport protocols, the following description will focus on data transport in a large network of OpenFlow configured devices with potentially multiple controllers when the IP connectivity has not yet been established between the device and the controller(s) and all the devices and the controller are in the same L2 domain with the devices running a Layer 2 link discovery protocol like LLDP when the devices boot up or initialize. One benefit of the examples described herein is a simple and scalable technique for the discovery of the network controller(s) in a network without resorting to broadcast and using a minimal number of exchanged messages.

Figure 2:
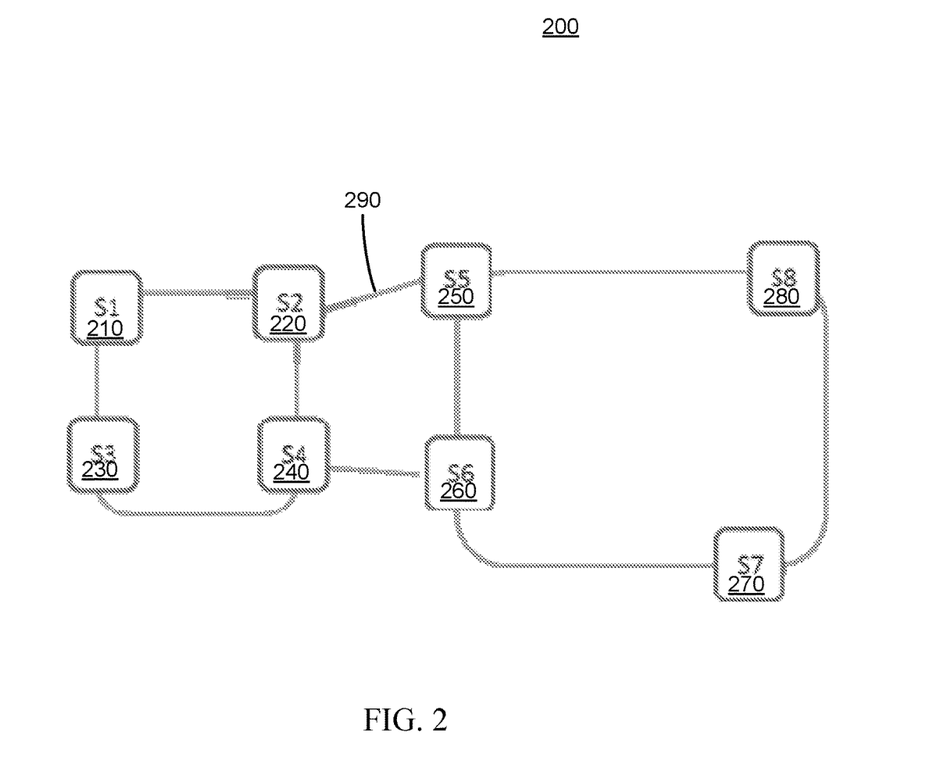
FIG. 2 illustrate an exemplary network in accordance with some examples of the disclosure.

FIG. 2 illustrate an exemplary network in accordance with some examples of the disclosure. As shown in FIG. 2, a network 200 may include a first device 210 (e.g. node 12 or similar), a second device 220 (e.g. node 12 or similar), a third device 230 (e.g. node 12 or similar), a fourth device 240 (e.g. node 12 or similar), a fifth device 250 (e.g. node 12 or similar), a sixth device 260 (e.g. node 12 or similar), a seventh device 270 (e.g. node 12 or similar), and an eighth device 280 (e.g. node 12 or similar) interconnected as shown by a plurality of links 290. In this example, a controller (e.g. controller 10) of the second device 220 may be configured as the SDN controller for the network 200. Thus, the second device or Controller 220 may send out the initial link discovery protocol packet on each port of the second device 220 that meet certain eligibility criteria. For example, if the remote device Identification (ID) is greater than the local device ID.

Each port on a device that receives this link discovery protocol packet takes an action depending on that device's current state. The current state of the remote device may be one of a first state indicating the controller is discovered (e.g. DISCOVERED_CONTROLLER), a second state indicating the controller discovery has been initialized (e.g. DISCOVERY_INIT), a third state indicating that the controller discovery has failed (e.g. DISCOVERY_FAIL), or a fourth state indicating that the device is waiting for a discovery response (e.g. DISCOVERY_WAIT). The first state is a state which has already discovered a controller; the second state is a state where the port has previously received a message that indicated a failure to discovering the controller; the third state is a state where the port has not transmitted or received messages of any kind; and the fourth state describes a state waiting to discover its controller.

The network 200 may employ three types of messages in an exemplary discovery packet. A first message type (e.g. LOOKING_FOR_CONTROLLER), a second message type (e.g. I_AM_CONTROLLER), and a third message type (e.g. PROXY_FOR_CONTROLLER). The first message type being a request for controller discovery and the second and third message types being responses to the request. The response may also be a fourth message type (e.g. CONTROLLER_NOT_FOUND) when the discovery packet has reached a maximum number of hops and controller 220 was not found. When a first message type reaches the controller 220, it responds to the message with the second message type that may include the controller 220 IP address embedded in the message. Each device 210-280 keeps track of which port the link discovery protocol message was sent on. Each non-controller device 210 and 230-280 also proxies for other devices looking for the controller 220 with the third message type to have the whole network converge faster and connect with the controller 220.

In one example, device 210-280 applies certain rules to transmit a first message type: (1) Forward the a packet with the first message type on ports on which such a message has not been sent previously starting with the lowest port and that port is put in the second state; (2) a device 210-280 may only send the first message type to another of the devices 210-280 with a higher ID and may not send the message to another of the devices 210-280 with a lower ID ensuring that the device 210-280 may not receive a discovery message that it sent through another port of the device; and (3) the message received on any other port will not be responded to until the device receives a response on the port on which the message was sent.

As soon as the first type message is sent on a port it changes state to fourth state; these two actions may be automatic with regard to each other. The device tries to find a higher ID switch to forward the message to. If it does find one, it sends the first type message forward; if not the device just terminates the process for that device. At this point it has found a controller and proxies with a response or it just waits for a gratuitous response from another device that it is connected to.

The following rules may be used by devices 210-280 to transmit a third type message. First, the device forwards the message on a port on which the DISCOVERY message was received previously. A device may only send the third type message to a port if the device with a higher ID has been seen on the remote end of the port and also has received a prior first type message on that port.

The second type message may be sent to all ports in an effort to quickly disseminate the information in the network. This process assumes that devices exchange other information when the device is link discovery protocol enabled implying that the devices have a way to form an order amongst the devices as being less than or greater than the local device ID. For instance, in LLDP, the basic Chassis ID LLDP TLV may be used to order all the neighboring devices. The objective of this step is to accumulate the neighbor device ID. One exemplary step in the process associates ports and the device ID that is reachable though that port, the types of messages that could be transmitted or received to/from that port and also the state of the port.

For example, the second device 220 may be configured as the controller for the network 200. For the other devices in the network 200 to discover the controller 220, the following process may be used (each other device sends the first message type to all connected devices with a higher ID). First, the first message type is sent from the first device 210 to the controller 220 and the third device 230, the controller 220 does not send this message type as the controller 220 does not need to discover itself, the third device sends the first message type to the fourth device 240, the fourth device 240 sends the first message type to the sixth device 260, the fifth device 250 sends the first message type to the sixth device 260 and the eighth device 280, the sixth device 260 sends the first message type to the seventh device 270, and the seventh device 270 sends the first message type to the eighth device 280. The distribution of the first message type may occur simultaneously or in a relatively short time span.

Next, the second message type flow in the process may involve the controller 220 sending the second message type to the first device 210, the fourth device 240, and the fifth device 250 (sending the message to all connected devices). Lastly, the third message type is selectively sent from the fourth device 240 to the third device 230, the fifth device 250 sends the third message type to the sixth device 260 and the eighth device 280, and the sixth device 260 sends the third message type to the seventh device 270. At this point, all the devices 210-280 in the network 200 may update local databases, such as configuration databases 65, with the information on the controller 220 and the network topology etc.

Figure 3:
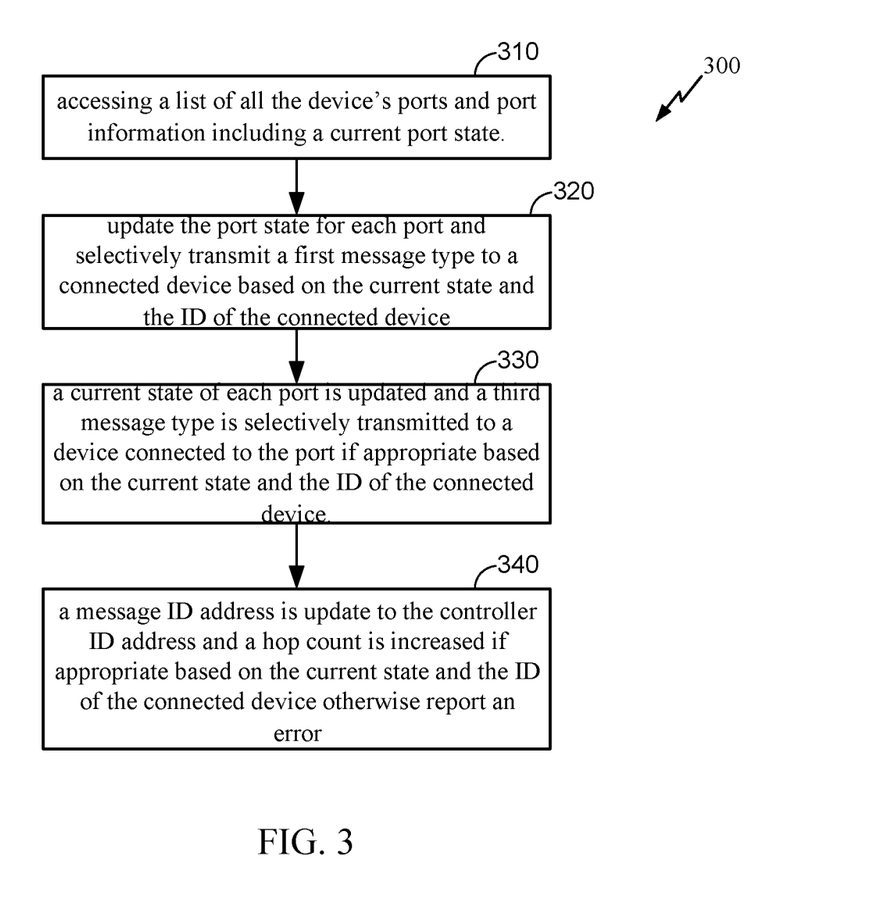
FIG. 3 illustrates an exemplary partial process to transmit the message types in accordance with some examples of the disclosure.

FIG. 3 illustrates an exemplary partial process to transmit the message types in accordance with some examples of the disclosure. As shown in FIG. 3, the partial process 300 begins in block 310 with a device accessing a list of all the device's ports and port information including a current port state. Next in block 320, a current state of each port is updated and a first message type is selectively transmitted to a device connected to the port if appropriate based on the current state and the ID of the connected device. For example, if a current state of a port is the third state: the device skips that port and moves on to the next port in the list. If the current state of the port is the second state and a device connected to that port has a higher ID than the device: change the port state to the fourth state, transmit a first type message to the connected device (this message may be sent once or multiple times to ensure reliable transmission), update the port state to the third state if no response to the first type message is received from the connected device, and move to the next port in the list. If the current state of the port is the second state and a device connected to that port has a lower ID than the device: an error condition is indicated. If the current state of the port is the second state and a device connected to that port has an ID equal to the device: change the port state to the third state and move to the next port in the list.

Next in block 330, a current state of each port is updated and a third message type is selectively transmitted to a device connected to the port if appropriate based on the current state and the ID of the connected device. If a current state of a port is the fourth state a device connected to that port has a higher ID than the device and the controller has been discovered: change a message IP address to the controller IP address, change a message hop counter to the controller hop counter plus one, and transmit a third type message to the connected device (this message may be sent once or multiple times to ensure reliable transmission). If the controller has not been discovered, this port is skipped and the process moves on to the next port in the list. If the current state of the port is the fourth state and a device connected to that port has a lower ID than the device: an error condition is indicated. If the current state of the port is the fourth state and a device connected to that port has an ID equal to the device: change the port state to the third state and move to the next port in the list. Next in block 340, a message ID address is update to the controller ID address and a hop count is increased if appropriate based on the current state and the ID of the connected device.

Figure 4:
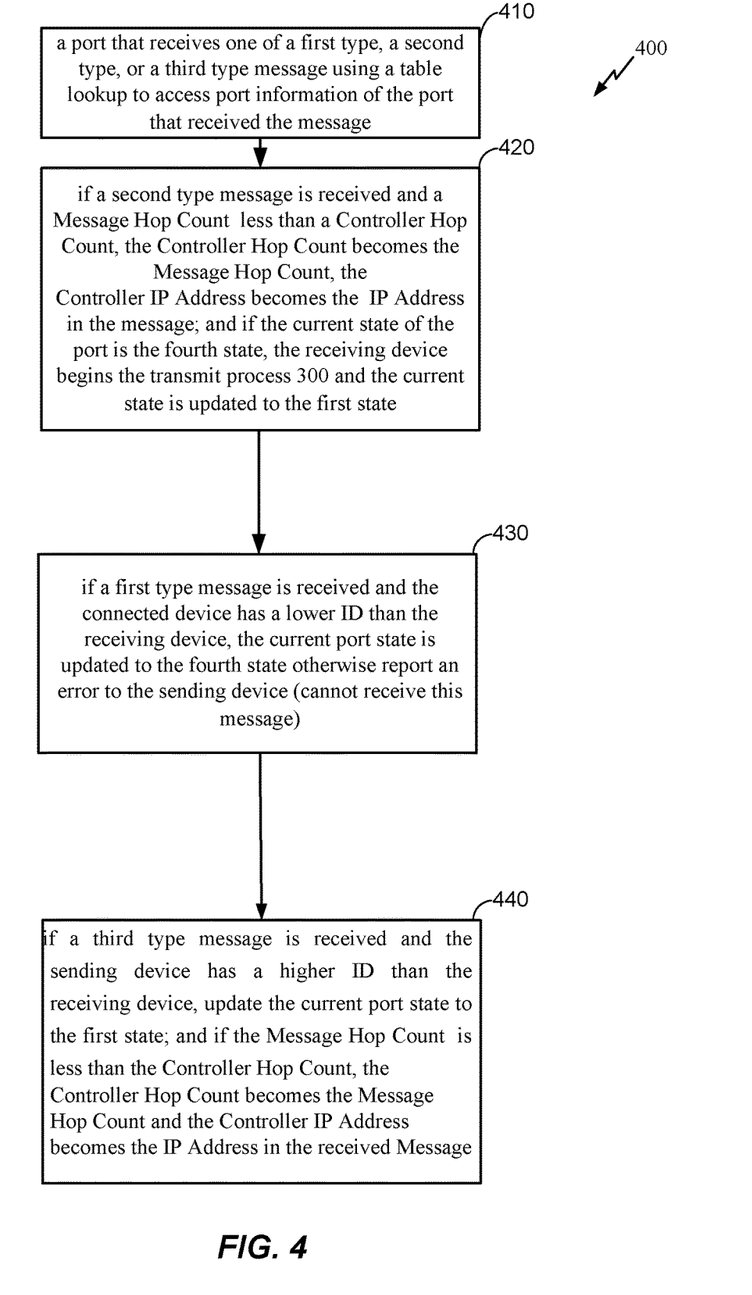
FIG. 4 illustrates an exemplary partial process to receive the message types in accordance with some examples of the disclosure.

FIG. 4 illustrates an exemplary partial process to receive the message types in accordance with some examples of the disclosure. The partial process 400 may include steps a device applies to receive a second type/third type message (If the connected device has a higher ID, then the controller have been discovered and update the hop count to the controller otherwise, report an error). As shown in FIG. 4, the partial process 400 begins in block 410 with a port that receives one of a first type message, a second type message or a third type message using a table lookup to access port information of the port that received the message. In block 420, if a second type message is received and a Message Hop Count less than a Controller Hop Count, the Controller Hop Count becomes the Message Hop Count, the Controller IP Address becomes the IP Address in the message; and if the current state of the port is the fourth state, the receiving device begins the transmit process 300 and the current state is updated to the first state. In block 430, if a first type message is received and the connected device has a lower ID than the receiving device, the current port state is updated to the fourth state otherwise report an error to the sending device (cannot receive this message). In block 440, if a third type message is received and a the sending device has a higher ID than the receiving device, update the current port state to the first state; and if the Message Hop Count is less than the Controller Hop Count, the Controller Hop Count becomes the Message Hop Count and the Controller IP Address becomes the IP Address in the received Message.

Although examples described herein were described in the context of pure OpenFlow networks, the systems and methods described herein may be easily extended to other types of networks such as (a) consisting both OpenFlow and non-OpenFlow devices, or (b) non-OpenFlow based SDN networks. In such networks, the protocol may simply be extended to have all non-participating devices simply relay the link discovery protocol based messages all the way to the controller(s) and back. This would only have to be done once, because, subsequently, the node with the knowledge of controller(s) would be able to issue the third message types. Also, there are a number of schemes assigning IP address without a traditional, broadcast based DHCP in large Ethernet networks, and these alternative schemes may be used as well. In the described examples, initially, the Media Access Control (MAC) address can be used to uniquely identify a device. Later on, the device may be configured with a device ID. In addition, processes described may be customized to send a discovery message from just one link to all the links where the message can be sent (subject to the condition RemoteSwitchID>LocalSwitchID). Sending it on just one port minimizes the number of messages while potentially causing a longer delay in finding the controller. At the other end of the spectrum, flooding all eligible links with these messages increases the probability that the device learns of the controller sooner, but incurs an overhead involving an increased number of discovery messages. Furthermore, the third message type may be sent to all eligible links as soon as possible to minimize the amount of time taken to learn the whereabouts of a new controller.

The word "exemplary" is used herein to mean "serving as an example, instance, or illustration." Any details described herein as "exemplary" is not necessarily to be construed as preferred or advantageous over other examples. Likewise, the term "examples" does not require that all examples include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples only and is not intended to be limiting of examples of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium (transient and non-transient) having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, step, feature, benefit, advantage, or equivalent to the public, regardless of whether the component, step, feature, benefit, advantage, or the equivalent is recited in the claims.

Further, those of skill in the art will appreciate that the various illustrative logical blocks, modules, circuits, and algorithm steps described in connection with the examples disclosed herein may be implemented as electronic hardware, software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method step or as a feature of a method step. Analogously thereto, aspects described in connection with or as a method step also constitute a description of a corresponding block or detail or feature of a corresponding device. Some or all of the method steps can be performed by a hardware apparatus (or using a hardware apparatus), such as, for example, a microprocessor, a programmable computer or an electronic circuit. In some examples, some or a plurality of the most important method steps can be performed by such an apparatus.

In the detailed description above it can be seen that different features are grouped together in examples. This manner of disclosure should not be understood as an intention that the claimed examples require more features than are explicitly mentioned in the respective claim. Rather, the situation is such that inventive content may reside in fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods disclosed in the description or in the claims can be implemented by a device comprising means for performing the respective steps or actions of this method.

Furthermore, in some examples, an individual step/action can be subdivided into a plurality of sub-steps or contain a plurality of sub-steps. Such sub-steps can be contained in the disclosure of the individual step and be part of the disclosure of the individual step.

While the foregoing disclosure shows illustrative examples of the disclosure, it should be noted that various changes and modifications could be made herein without departing from the scope of the disclosure as defined by the appended claims. The functions, steps and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A method comprising:
setting a current state of a first port of a first device to a second state that indicates the first port of the first device has not sent or received one of a first discovery message or a second discovery message;
transmitting the first discovery message to a first port of a second device connected to the first port of the first device, the first discovery message having a first message type;
upon transmitting the first discovery message, setting the current state of the first port of the first device to a fourth state that indicates the first port of the first device has sent the first discovery message;
receiving a first response message at the first port of the first device;
if the first response message has a second message type, updating a database of the first device with an IP address of the second device and setting the current state of the first port of the first device to a first state that indicates a controller has been discovered; and
if the first response message has a third message type, updating the database of the first device with an IP address in the first response message and setting the current state of the first port of the first device to the first state that indicates the controller has been discovered.

2. The method of claim 1, further comprising transmitting the second discovery message if the first response message has not been received in a first time period.

3. The method of claim 1, wherein if the first response message is the second message type, updating the database of the first device with a hop count of the second device.

4. The method of claim 3, wherein if the first response message is the third message type, updating the database of the first device with a hop count in the first response message.

5. The method of claim 1, wherein if the first response message is the third message type, updating the database of the first device with a hop count in the first response message.

6. The method of claim 1, wherein the first port of the first device transmits the first discovery message to the first port of the second device if an identification value of the second device is higher than an identification value of the first device.

7. The method of claim 6, wherein if the identification value of the second device is less than the identification value of the first device, the transmitting the first discovery message is skipped.

8. The method of claim 7, wherein if the identification value of the second device is equal to the identification value of the first device, the transmitting the first discovery message is skipped and the current state of the first port of the first device is set to a third state that indicates the controller has not been discovered.

9. The method of claim 1, further comprising:
setting a current state of a second port of the first device to the second state that indicates the second port of the first device has not sent or received the discovery message;

transmitting the second discovery message to a first port of a third device connected to the second port of the first device, the second discovery message having the first message type;
upon transmitting the second discovery message, setting the current state of the second port of the first device to a fourth state that indicates the second port of the first device has sent the second discovery message;
receiving a second response message at the second port of the first device;
if the second response message is the second message type, updating the database of the first device with an IP address of the third device and setting the current state of the second port of the first device to the first state that indicates the controller has been discovered;
if the second response message is the third message type, updating the database of the first device with an IP address in the second response message and setting the current state of the second port of the first device to the first state that indicates the controller has been discovered; and
updating the database of the first device with one of a hop count, a latency, or a geographic constraint configured to indicate a controller location.

10. An apparatus comprising:
a first controller configured to:
set a current state of a first port of a first device to a second state that indicates the first port of the first device has not sent or received one of a first discovery message or a second discovery message;
transmit a first discovery message to a first port of a second device connected to the first port of the first device, the first discovery message having a first message type;
upon transmitting the first discovery message, set the current state of the first port of the first device to a fourth state that indicates the first port of the first device has sent the first discovery message;
receive a first response message at the first port of the first device;
if the first response message has a second message type, update a database of the first device with an IP address of the second device and setting the current state of the first port of the first device to a first state that indicates a controller has been discovered; and
if the first response message has a third message type, update the database of the first device with an IP address in the first response message and setting the current state of the first port of the first device to the first state that indicates the controller has been discovered.

11. The apparatus of claim 10, wherein the first controller is further configured to transmit the second discovery message if the first response message has not been received in a first time period.

12. The apparatus of claim 10, wherein the first controller is further configured to update a database of the first device with a hop count of the second device if the first response message is the second message type.

13. The apparatus of claim 12, wherein the first controller is further configured to update the database of the first device with a hop count in the first response message if the first response message is the third message type.

14. The apparatus of claim 10, wherein the first controller is further configured to update the database of the first device with a hop count in the first response message if the first response message is the third message type and wherein the first device and the second device are configured as a packet optical switch.

15. A non-transient computer readable medium containing program instructions for causing a processor to perform a process comprising:
   setting a current state of a first port of a first device to a second state that indicates the first port of the first device has not sent or received one of a first discovery message or the second discovery message;
   transmitting a first discovery message to a first port of a second device connected to the first port of the first device, the first discovery message having a first message type;
   upon transmitting the first discovery message, setting the current state of the first port of the first device to a fourth state that indicates the first port of the first device has sent the first discovery message;
   receiving a first response message at the first port of the first device;
   if the first response message has a second message type, updating a database of the first device with an IP address of the second device and setting the current state of the first port of the first device to a first state that indicates a controller has been discovered; and
   if the first response message has a third message type, updating the database of the first device with an IP address in the first response message and setting the current state of the first port of the first device to the first state that indicates the controller has been discovered.

16. The non-transient computer readable medium of claim 15, the process further comprising transmitting the second discovery message if the first response message has not been received in a first time period.

17. The non-transient computer readable medium of claim 15, the process further comprising if the first response message is the second message type, updating a database of the first device with a hop count of the second device.

18. The non-transient computer readable medium of claim 17, the process further comprising if the first response message is the third message type, updating the database of the first device with a hop count in the first response message.

19. The non-transient computer readable medium of claim 18, the process further comprising if the first response message is the third message type, updating the database of the first device with a hop count in the first response message.

20. The non-transient computer readable medium of claim 15, the process further comprising:
   setting a current state of a second port of the first device to the second state that indicates the second port of the first device has not sent or received the discovery message;
   transmitting the second discovery message to a first port of a third device connected to the second port of the first device, the second discovery message having the first message type;
   upon transmitting the second discovery message, setting the current state of the second port of the first device to a fourth state that indicates the second port of the first device has sent the second discovery message;
   receiving a second response message at the second port of the first device;
   if the second response message is the second message type, updating the database of the first device with an IP address of the third device and setting the current state of the second port of the first device to the first state that indicates the controller has been discovered; and
   if the second response message is the third message type, updating the database of the first device with an IP address in the second response message and setting the current state of the second port of the first device to the first state that indicates the controller has been discovered.

* * * * *